(12) United States Patent
Schott et al.

(10) Patent No.: US 10,967,549 B2
(45) Date of Patent: Apr. 6, 2021

(54) PULL OR PUSH ROD OR LOCKING NUT FOR A MOLDING MACHINE

(71) Applicant: ENGEL AUSTRIA GmbH, Schwertberg (AT)

(72) Inventors: Guenter Schott, St. Valentin (AT); Markus Stoeger, St. Peter in der Au (AT); Richard Czepl, St. Valentin (AT); Herbert Zeidlhofer, Haag (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 284 days.

(21) Appl. No.: 16/180,314

(22) Filed: Nov. 5, 2018

(65) Prior Publication Data
US 2019/0134871 A1 May 9, 2019

(30) Foreign Application Priority Data
Nov. 7, 2017 (AT) ................ A 50934/2017

(51) Int. Cl.
*F16B 39/30* (2006.01)
*B29C 45/67* (2006.01)
(Continued)

(52) U.S. Cl.
CPC ........... *B29C 45/6714* (2013.01); *B21K 1/54* (2013.01); *B21K 1/56* (2013.01); *B21K 1/64* (2013.01);
(Continued)

(58) Field of Classification Search
CPC .......... F16B 25/00; F16B 33/00; F16B 33/02; F16B 35/007; F16B 37/002; F16B 37/04;
(Continued)

(56) References Cited

U.S. PATENT DOCUMENTS

| 982,573 | A | * | 1/1911 | Cade | ...................... B60C 15/028 |
|---|---|---|---|---|---|
| | | | | | 152/400 |
| 2,036,604 | A | * | 4/1936 | Pickop | .................... F16B 39/30 |
| | | | | | 411/308 |

(Continued)

FOREIGN PATENT DOCUMENTS

| AT | 399 843 | 7/1995 |
|---|---|---|
| AT | 513 131 | 2/2014 |

(Continued)

OTHER PUBLICATIONS

Standard Work, Machine Elements, Chapter 3, "Practical Strength Calculation", Niemann, Winter, Berlin, Germany, 4th Edition, 2016 (with English-language explanation of relevance).

(Continued)

*Primary Examiner* — Roberta S Delisle
(74) *Attorney, Agent, or Firm* — Wenderoth, Lind & Ponack, L.L.P.

(57) ABSTRACT

A pull or push rod for a molding machine having a groove. The groove is suitable for forming a positive-locking connection with a locking nut, by which positive-locking connection forces are transmittable between the locking nut and the pull or push rod. The groove has a groove cross-section, has at least two groove flanks, and has a groove base. The at least two groove flanks, viewed in the groove cross-section, each transition with at least one transition curvature into the groove base. The groove base in the groove cross-section is at least partially formed as a curvature, and the curvature of the groove base differs from the transition curvatures of the groove flanks.

39 Claims, 3 Drawing Sheets

(51) Int. Cl.
*B21K 1/54* (2006.01)
*B29C 45/66* (2006.01)
*B21K 1/56* (2006.01)
*B21K 1/64* (2006.01)

(52) U.S. Cl.
CPC .......... *B29C 45/66* (2013.01); *B29C 45/6728* (2013.01); *F16B 39/30* (2013.01)

(58) Field of Classification Search
CPC .......... F16B 39/30; F16B 41/002; B21K 1/54; B21K 1/56; B21K 1/64; B29C 33/20; B29C 33/202; B29C 45/66; B29C 45/6714; B29C 45/6728
USPC ............................... 411/337, 366.1; 425/589
See application file for complete search history.

(56) References Cited

U.S. PATENT DOCUMENTS

| | | | | |
|---|---|---|---|---|
| 4,583,897 A | * | 4/1986 | Briles | F16B 5/02 403/408.1 |
| 4,701,088 A | * | 10/1987 | Crull | F16B 43/001 411/369 |
| 4,799,844 A | * | 1/1989 | Chuang | F16B 33/02 411/414 |
| 4,842,466 A | * | 6/1989 | Wheeler | F16B 33/02 411/366.3 |
| 5,163,523 A | * | 11/1992 | Yousef | E21B 17/0426 175/320 |
| 8,221,670 B2 | | 7/2012 | Schad et al. | |
| 8,226,333 B2 | * | 7/2012 | Kakai | B23B 51/00 407/54 |
| 8,337,196 B2 | | 12/2012 | Schad et al. | |
| 9,067,355 B2 | | 6/2015 | Schad et al. | |
| 9,452,559 B2 | | 9/2016 | Zeidlhofer et al. | |
| 9,636,859 B2 | | 5/2017 | Schad et al. | |
| 10,086,428 B2 | | 10/2018 | Fujioka et al. | |
| 2002/0172573 A1 | * | 11/2002 | Pamer | G11B 5/102 411/337 |
| 2003/0210970 A1 | * | 11/2003 | Bechtel, Jr. | B21K 1/56 411/411 |
| 2007/0071576 A1 | * | 3/2007 | Romano | F16B 35/065 411/399 |
| 2011/0233823 A1 | | 9/2011 | Schad et al. | |
| 2011/0236527 A1 | | 9/2011 | Schad et al. | |
| 2011/0268834 A1 | | 11/2011 | Schad et al. | |
| 2012/0076613 A1 | * | 3/2012 | Ishida | F16B 33/004 411/337 |
| 2014/0212531 A1 | | 7/2014 | Zeidlhofer et al. | |
| 2014/0363535 A1 | | 12/2014 | Schad et al. | |
| 2015/0035273 A1 | * | 2/2015 | Moore | E21B 17/042 285/333 |
| 2015/0290856 A1 | | 10/2015 | Schad et al. | |
| 2016/0184887 A1 | | 6/2016 | Fujioka et al. | |

FOREIGN PATENT DOCUMENTS

| | | |
|---|---|---|
| AT | 13625 | 5/2014 |
| AT | 514246 | 11/2014 |
| CN | 102615786 | 8/2012 |
| CN | 203496244 | 3/2014 |
| CN | 204322445 | 5/2015 |
| CN | 106671345 | 5/2017 |
| DE | 10 2014 000 837 | 7/2014 |
| DE | 10 2016 002 305 | 9/2016 |
| EP | 2 243 615 | 10/2010 |
| GB | 1388715 | 3/1975 |
| JP | 2004-209949 | 7/2004 |
| JP | 2004-351896 | 12/2004 |
| JP | 2012-218263 | 11/2012 |
| JP | 2016-120514 | 7/2016 |
| WO | 2010/037234 | 4/2010 |
| WO | 2010/037236 | 4/2010 |

OTHER PUBLICATIONS

Misumi, "Standard Components for Plastic Mold", Misumi USA [online], Aug. 1, 2015.

CAD.DE discussion Freistich and graphic, Jan. 14, 2016, http://ww3.cad.de/foren/ubb/Forum2/HTML/029169.shtml;https://ww3.cad.de/foren/ubb/uploads/sw4you/Freistich.jpg, with explanation of relevance.

* cited by examiner

PULL OR PUSH ROD OR LOCKING NUT FOR A MOLDING MACHINE

BACKGROUND OF THE INVENTION

The invention concerns a pull or push rod for a molding machine with at least one groove, as well as a locking nut for a molding machine with at least one groove, a clamping unit of a molding machine or a molding machine with a clamping unit, and a method for producing a pull or push rod or a locking nut for a molding machine.

Molding machines may be understood to be injection molding machines, transfer molding machines, presses and the like.

In the following, the prior art is explained using an example of an injection molding machine.

An injection process usually begins with the closing of the clamping unit, by bringing the movable mold mounting plate towards the fixed mold mounting plate by a rapid stroke movement. The movable mold mounting plate is then locked with the pressure applying piston part of a clamping force mechanism, and the clamping force mechanism builds up the locking force required for the injection process.

One or more tie bars are often used to guide the movable mold mounting plate. In case of an injection molding machine with a tie bar, the clamping force mechanism is often a hydraulic cylinder, whose piston exerts a force via the tie bar onto the movable mold mounting plate. Also common is the case of an injection molding machine with four tie bars. Here, the clamping force mechanism is often designed as a pressure pads between the mold mounting plates or at the ends of the tie bars. Also these pressure pads are often designed hydraulically, as high pressures have to be built up in a relatively short time.

In other words, these tie bars are pull rods or push rods. These pull rods or push rods are attached, for example, to the fixed mold mounting plate. On the opposite side of the pull or push rods, these are provided with grooves which serve to form a positive-locking releasable connection with a locking nut, and, via this locking nut, to apply pulling or compression forces to the pull or push rods in order to be able to move the movable mold mounting plate with respect to the fixed mold mounting plate, or to be able to press it against each other. Such locking nuts are usually designed as half-shells, which can be brought into a locking position by bringing them together. This serves to enable a rapid stroke drive in the unlocked state of the locking nut to move the movable mold mounting plate at a higher speed in relation to the fixed mold mounting plate. When tools mounted on the mold mounting plates (almost) contact each other, the lock nut/s can be brought into a locking position in order to apply clamping force by the locking mechanism, which has a smaller range of motion and a lower speed, but through which higher forces can be applied.

By exerting the locking force on the movable mold mounting plate, the movable mold mounting plate is pressed to the fixed mold mounting plate in the range of 15,000 kN, for example. With such high locking forces, the pull or push rod/s must have to be designed with a high corresponding strength, requiring a high amount of material. The grooves in the pull or push rods represent a notch, and thus form the cross-section of the highest load in the groove cross-section of the pull or push rod.

SUMMARY OF THE INVENTION

The object of invention is to produce a pull or push rod for a molding machine or a locking nut for a molding machine with at least one groove, which has increased strength with essentially the same material expenditure. In other words, the pull or push rod is to be improved in such a way that the material consumption is reduced while the strength remains basically the same. In this way, the available space for construction between the pull or push rods can be enlarged by increasing the clearance between two or more pull or push rods (by reducing their diameter). The diameter of the pull rods or push rods is kept as small as possible.

This object is solved by a pull or push rod for a molding machine with at least one groove, and a locking nut for a molding machine with at least one groove, a clamping unit of a molding machine or a molding machine with a clamping unit, and a method for producing a pull or push rod or a locking nut for a molding machine.

A pull or push rod according to the invention for a molding machine with at least one groove is suitable for making a positive-locking connection with a locking nut according to the invention for a molding machine with at least one groove. Here, the pull or push rod and/or the locking nut has a groove cross-section with at least two groove side walls and a groove base. The at least two groove side walls, viewed in the groove cross section, are each provided with at least one transition curvature into the groove base, and the groove base in the groove cross-sections formed at least partially as a curvature. The curvature of the groove base differs from the transition curvatures of the groove side walls. When designing the cross-section of the groove, the invention can at the same time achieve a relatively small depth of the groove and relatively large curvatures for the transitions from the side walls to the groove base, which in themselves are contradictory requirements.

The reduced depth reduces the influence of the notch, which the at least one groove represents. The curvatures reduce the notch effect. All in all, under the effect of the locking force in the pull or push rod, reduced tensions occur in the vicinity of the at least one groove. This allows material to be saved and/or higher strength of the pull or push rod to be achieved.

In general, all information to the geometric dimensions and ratios given in this disclosure are to be understood as dimensions and ratios in a non-deformed state (without application of force). In other words, the dimensions and ratios could also be referred to as manufacturing data. Depending on the material used and the force applied to the components, elastic and in some cases plastic deformations will occur during operation, wherein these deformations will lead to changes in dimensions and ratio.

In the present disclosure, the formulation "that a first quantity X stands to a second quantity Y in a ratio of Z" is to be understood as meaning that "X:Y=Z" applies.

Accordingly, the formulation "that a first quantity X stands to a second quantity Y in a ratio of $Z_1$ to $Z_2$" is to be understood as a range for which "X:Y=$Z_1$ to X:Y=$Z_2$" applies.

The pull or push rod is solid as a solid rod or also as a pipe. The curvature of the groove base may also differ only from at least one curvature of the transition curvatures of the at least two groove side walls, or from more or all curvatures of the transition curvatures of the at least two groove side walls.

It may preferably be provided that the pull or push rod has a rotationally symmetrical base body. For example, it may be preferably provided that the pull or push rod has a cylindrical base shape.

In a possible embodiment it may be provided that a radius of an imaginary circle of curvature at at least one point of the curvature of the groove base has a finite value greater than zero, which differs from a radius of an imaginary circle of curvature at at least one point of the at least one transition curvature of the transitions.

It is preferably provided that the at least one groove is designed completely or partially circumferentially on the pull or push rod or the locking nut. For example, a possible embodiment may provide that a groove is formed circumferentially on a rotationally symmetrical base body. However, it may also be provided that a groove cuts through a pull or push rod one-sided straight-lined only.

It can also be advantageously provided that at least a first one of the at least two groove side walls has an angle of 70° to 110°, preferably 80° to 100°, with respect to a surface of the pull or push rod or a surface of an imaginary core hole of the locking nut. It is particularly preferred to provide that this angle is 90° or rectangular to the surface. Particularly advantageous it may be provided that a second of the at least two groove side walls has an angle of 70° to 150°, preferably 88° to 120°, particularly preferably 90°, with respect to a surface of the pull or push rod or a surface of an imaginary core hole of the locking nut.

In another preferred embodiment it can be provided that the at least one groove wraps around a surface of the pull or push rod or a surface of an imaginary core hole of the locking nut in a thread-like manner a surface of the pull or push rod or a surface of an imaginary core hole of the locking nut. It is particularly preferred to provide that the groove has an incline which is parallel to the central axis of the pull or push rod or locking nut, and is at least greater than a groove width of the at least one groove per rotation, and preferably corresponds two or four times the groove width per rotation. It may also be provided that one groove is designed to be circumferential and has no incline. In this case, it may also be provided that several grooves, preferably with the same geometry, are arranged next to each other. In this case we speak of a pitch, which defines the distance between two grooves, or the distance between a (periodically) recurring structure of the grooves.

Preferably it is provided that
a minimum diameter of the pull or push rod at the groove base to an outer diameter of the pull or push rod and/or
a diameter of an imaginary core hole of a locking nut to a maximum inner diameter at the groove base
is in a ratio of 0.89 to 0.95, preferably in a ratio of 0.89.

It may be particularly preferred provided that several grooves are provided next to each other and have a distance to each other, which can correspond to at least one groove width, preferably two or four times the groove width. The number of grooves required can be calculated using the groove depth (side wall length or also contact length between the pull or push rod and the locking nut), the force to be transmitted and the maximum permissible stresses based on the material used. It is preferably provided that the outer diameter of the pull or push rod, or the diameter of an imaginary core hole of the locking nut, is in a ratio of 10 to 20 to the groove depth, preferably in a ratio of 12 to 18, particularly preferably in a ratio of 14 to 17. It is particularly preferred that the outer diameter of the pull or push rod or the diameter of an imaginary core hole of the locking nut is in a ratio of 15 to 27 to the groove width, preferably in a ratio of 18 to 24. Furthermore, it may be provided that the outer diameter of the pull or push rod, or the diameter of an imaginary core hole of the locking nut, is in a ratio of 5 to 13, preferably 7 to 11, to an incline or pitch of the groove or grooves.

Preferably it can be provided that the locking nut has 6 to 18, preferably 13 to 15, grooves, which are formed periodically or not periodically consecutively.

It is particularly preferred provided that at least one transition curvature of the at least two groove side walls transitions tangentially into the groove base, preferably tangentially transitions into the curvature of the groove base. Here, a tangent is to be understood in such a way that an imaginary straight section of the transition point is normal to the imaginary line of the transition point to the center point of the curvature. This straight section again forms the tangent, which is normal to the imaginary straight section of the transition point of the curvature of the groove base and its center point. In particular, it may be preferably provided that at least one of the transition curvatures of the at least two side walls transitions tangentially into the groove base or the curvature, which forms the groove base.

With another embodiment of the invention, it may be provided that the transition curvatures are formed as transition radii. It may preferably be provided that the at least one transition radius of a first groove side wall is in a ratio of 1 to 2 to at least one transition radius of a second side wall of the at least two groove side walls, preferably in a ratio of 1.3 to 1.5, particularly preferably in a ratio of 1.4. Thus it can be advantageous, for example, if a pulling force is initiated into the pull or push rod or locking nut through a groove side wall, and a compressive force is initiated into the pull or push rod or locking nut through the other groove side wall. The at least one transition radius of the pull side can be smaller than the at least one transition radius of the compressive side. In this case, the groove side wall at which a pressing force is exerted, over the transition radius of the pull side, because due to the pressing force at the groove side wall, a bending torque arises, which results in a tension at the groove base, more precisely at the transition radius. In the same way, the groove side wall, on which a tensile force is exerted, has the transition radius of the compressive side.

It is preferably provided that an outer diameter of the pull or push rod or a diameter of an imaginary core hole of the locking nut is in a ratio of 30 to 50, preferably in a ratio of 35 to 45, to the at least one transition radius of a first groove side wall of the at least two groove side walls.

It is particularly preferably provided that an outer diameter of the pull or push rod or a diameter of an imaginary core hole of the locking nut is in a ratio of 40 to 60, preferably in a ratio of 48 to 58, to the at least one transition radius of a second groove side wall, which has at least two groove side walls.

Preferably it is provided that the curvature of the groove base is designed as a radius. It is particularly preferred provided that a ratio between the greater one of the amount of at least one transition radius of a first groove side wall, and at least one transition radius of a second groove side wall on the one hand, and a value of the radius of the groove base on the other hand, is 0.3 to 0.8, preferably 0.5 to 0.6. The applicant's tests have shown that the provision of a larger radius of the groove base in relation to the radii of the at least two groove side walls and their transitions to the groove base produces an optimal force transmission into the component body. This is the result of the fact that the main stress of the groove of the pull or push rod or of the locking nut appears at the groove base, since at this point the forces of the groove into the pull or push rod or into the locking nut are transmitted into or out of it.

It may preferably be provided that an outer diameter of the pull or push rod or a diameter of an imaginary core hole of the locking nut is in a ratio of 10 to 30 to the radius of the groove base, preferably in a ratio of 15 to 25.

In a preferred embodiment it is provided that the radius of the groove base has a finite value greater than zero, which differs from the transition radii of the transitions.

In another preferred embodiment, an undercut is provided, wherein the at least one undercut
provides an undercut cross-section
an undercut side wall and
an undercut ramp,
wherein the undercut side wall merges into an undercut base via at least one first undercut transition curvature, and the undercut base merges into the undercut ramp via at least a second undercut transition curvature, wherein the undercut base, viewed in the undercut cross section, is formed at least partially as an undercut curvature, wherein the curvature of the undercut base differs from the at least first and/or the at least second undercut transition curvature. When designing the cross-section of the undercut, a relatively small depth of the undercut and relatively large curvatures for the transitions of the undercut side wall and the undercut ramp into the undercut base can be achieved at the same time, which in and of themselves are opposing requirements.

The reduced depth of the undercut reduces the influence of the notch, which the at least one undercut represents. The undercut curvatures reduce the notch effect. Overall, under the influence of the locking force on the pull or push rod in the area of the at least one undercut, there are reduced tensions. This allows material to be saved and/or higher strengths to be achieved. The reduced depth of the undercut reduces the influence of the notch, which the at least one undercut represents. The undercut curvatures reduce the notch effect. Overall, under the influence of the locking force on the pull or push rod in the area of the at least one undercut, this results in reduced tensions. This allows material to be saved and/or higher strengths to be achieved.

It may be provided that the pull or push rod is massive in the form of a solid rod or a pipe. It may also be provided that the undercut curvature of the undercut base differs only from at least one undercut curvature of the undercut transition curvatures, or from more or all undercut curvatures of the undercut transition curvatures.

It is preferably provided that the at least one undercut is completely or only partially circumferentially designed on the pull or push rod or the locking nut. For example, it can be provided in a possible embodiment that the at least one undercut is designed to be circumferential on a rotationally symmetrical base body. However, it can also be provided that the at least one undercut cuts through a pull or push rod one-sided straight-lined only.

Advantageously it can also be provided that the undercut side wall has an angle of 70° to 110°, preferably 80° to 100° in relation to a surface of the pull or push rod or a surface of an imaginary core hole of the locking nut. It is particularly preferred provided that this angle is designed with 90° or rectangular to the surface.

It is particularly preferred provided that the at least one first or at least one second undercut transition curvature transitions tangentially into the undercut base, preferably tangentially transitions into the curvature of the undercut base. A tangent here is to be understood as an imaginary straight section at the point of transition normal to the imaginary line of the transition point to the center point of the curvature. This straight section in turn forms the tangent which is normal to the imaginary straight section of the transition point of the curvature of the undercut base and the center point.

In another preferred embodiment it may be provided that between the at least one first and/or the at least one second undercut transition curvature and the undercut base, a straight section viewed in the undercut cross-section is provided.

Preferably it is provided that the undercut ramp, viewed in the undercut cross-section, is of straight-line design, and has an angle of 175° to 150°, preferably 170° to 160°, and particularly preferably 165°, with respect to a surface of the pull or push rod or a surface of an imaginary core hole of the locking nut.

In a possible embodiment it may be provided that a radius of an imaginary curvature circle at at least one point of the undercut curvature of the undercut has a non-zero finite value, which differs from a radius of an imaginary curvature circle at at least one point of the at least one first undercut transition curvature and/or from an imaginary curvature circle at at least one point of the at least one second undercut transition curvature.

It is preferably provided that the at least one first undercut transition curvature is formed as a first undercut transition radius, and the at least one second undercut transition curvature is formed as a second undercut transition radius. It is preferably provided that the at least one second undercut transition radius is in a ratio of 20 to 2 to the at least one first undercut transition radius, preferably in a ratio of 7 to 4, particularly preferably in a ratio of 5.5.

It may preferably be provided that the curvature of the undercut base is designed as an undercut radius. In this case it may be provided that the value of the undercut radius of the undercut base is in a ratio of at least a first undercut transition radius of 10 to 1, preferably in a ratio of 5 to 2, particularly preferably in a ratio of 3.6. The applicant's tests have shown that the provision of a larger radius of the undercut base in relation to the first undercut transition radius of the undercut side wall produces an optimal force transmission or an optimal force flux in the pull or push rod or the locking nut.

The undercut radius or the undercut transition radius is here to be understood in such a way that the transition, viewed in cross-section, is designed as a circular arc which has a radius. Several radii can also be arranged one after the other.

There is also a demand for protection for a clamping unit of a molding machine or for a molding machine with a clamping unit with at least one locking nut according to the invention and/or at least one pull or push rod according to the invention. Here it is preferably provided that one of the at least two groove side walls represents a groove side wall of the pull side, and one of the at least two groove side walls represents a groove side wall of the compressive side, wherein the at least one transition radius of the groove side wall of the compressive side to the at least one transition radius of the groove side wall of the pull side, which connect the groove side wall to a groove base, is in a ratio of 1 to 2, preferably in a ratio of 1.3 to 1.6, particularly preferably in a ratio of 1.4.

Furthermore, protection is also demanded for a method of producing a pull or push rod or a locking nut for a molding machine, comprising at least the following steps:
Specifying a desired pulling or compressive force which is transmittable non-destructively with the pull or push rod or locking nut, selection of a suitable material for the pull or push rod or locking nut determination of a suitable groove geometry, in which the at least one groove has a groove cross-section, at least two groove side walls and a groove base, wherein the at least two groove side walls, viewed in the groove cross-section, merge in each case with at least one transition curvature into the groove base, wherein the groove base in the groove cross-section is formed at least partially as a curvature, wherein the curvature of the groove base differs from the transition curvatures of the groove side walls, determination of the minimum diameter of the pull or push rod or locking nut resulting from the desired pulling or compressive force, the selected material and the specified groove geometry, manufacturing of pull or push rod or locking nut with a specified diameter and a specified groove geometry from a specified material.

A non-destructive transmission of the pulling or compressive forces by means of a pull or push rod or a locking nut is not only to be understood as a transmission of the forces in which no failure of the pull or push rod or the locking nut takes place, but also as a transmission in which no permanent or plastic deformation of the pull or push rod or the locking nut takes place. Preferably, a fatigue strength of the pull or push rod or the locking nut can also be understood here.

In this case, it is preferably provided that the pull or push rod or locking nut is subjected to a coating process. By such a coating process, when producing a pull or push rod or a locking nut, the surface of these can be prepared for use. In this way, a surface can be protected against corrosion or, for example, made more robust against damage such as scratches. It can also be provided that a foreign material is applied to a base material by build-up welding.

Preferably, it may also be provided that the pull or push rod or locking nut is subjected to a method to change the material properties. A method such as nitriding or the use of alloys is referred to here purely as an example.

It may be provided that the pull or push rod or the locking nut is produced by means of a forming process. Thus, it may be advantageous for an exemplary embodiment if the pull or push rod or the locking nut is produced by a forging process. Deep rolling, bullet bombardment or needling can also give the surface of the pull or push rod or locking nut particularly favourable hardness and/or strength properties by inducing residual compressive stresses. This treatment(s) can be carried out at different temperatures (e.g. ambient temperature or workpiece temperature).

It is preferably provided that the pull or push rod or locking nut is produced by means of a machining process.

For example, it can be provided that a previously treated workpiece (which, for example, was cast) is brought to an oversize (final dimension/finish shape plus a small tolerance upwards) by a machining process (such as turning). In a further step, this exemplary workpiece can be subjected to a surface treatment process, in which the surface layers of the workpiece are hardened either by nitriding and/or hardening and/or a plastically deforming process. In a further step, the workpiece can subsequently be brought to its final dimension by a machining process (such as turning or grinding). A coating process can also additionally be used to increase the product life of the workpiece or the product service life of the meanwhile resulting pull or push rod or locking nut in use.

BRIEF DESCRIPTION OF THE DRAWINGS

Various embodiments of the invention result from the figures as well as the corresponding figure description. In the drawings.

DETAILED DESCRIPTION OF THE INVENTION

Figure 1A:
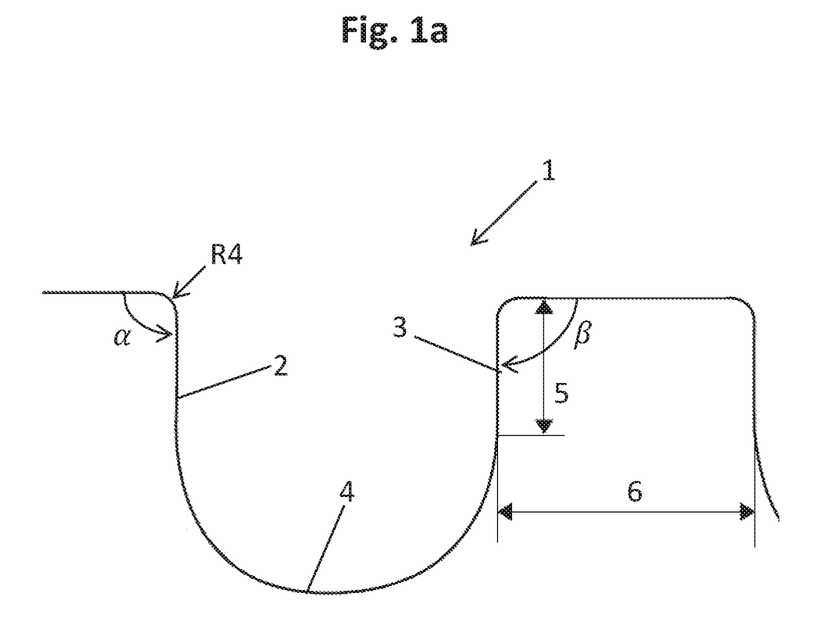
FIG. 1a, 1b shows a first embodiment of a pull or push rod or locking nut according to invention with detailed view on at least one first groove.
Figure 1B:
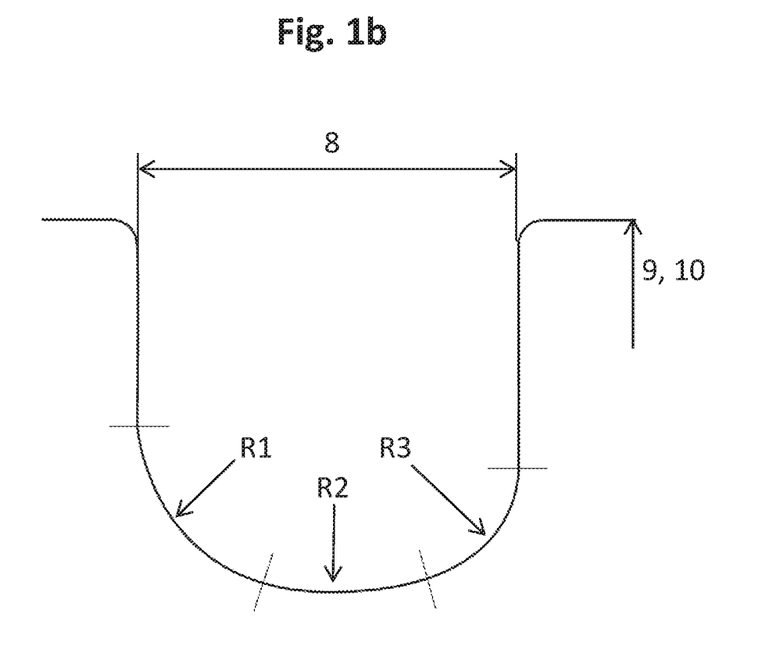

FIGS. 1a and 1b show a detailed view of a pull or push rod or locking nut according to the invention with a groove 1 in cross-section. The groove 1 is designed with two groove side walls 2, 3 and a groove base 4. Hereby it can be clearly seen that the groove side wall 2 first runs at a rectangular angle α from the surface of the pull or push rod or a surface of the imaginary core hole of the locking nut in the direction of groove base 4, which transitions tangentially into the transition curvature, which in this embodiment is formed as transition radius R1. This transition radius R1 subsequently flows tangentially into the curvature of the groove base 4, which in this exemplary embodiment is designed as radius R2. The groove base 4, designed by the radius R2, subsequently runs tangentially into the second transition curvature, which is designed as transition radius R3, which in turn transitions tangentially into the groove side wall 3. The groove side walls 2, 3 shown in this embodiment are chamfered by a radius R4 at their transition to the surface of the pull or push rod or the surface of the imaginary core hole of the locking nut. Depending on the force to be transmitted by the locking nut or the pull or push rod, the side wall length 5 can be adjusted, or also several grooves 1 can be provided at a distance of 6 from each other.

It can be seen well from the figures that the design of the groove base 4 as radius R2 makes it possible to reduce the notch effect through the transition radii without this causing a significant deepening of the groove 1.

Figure 2:
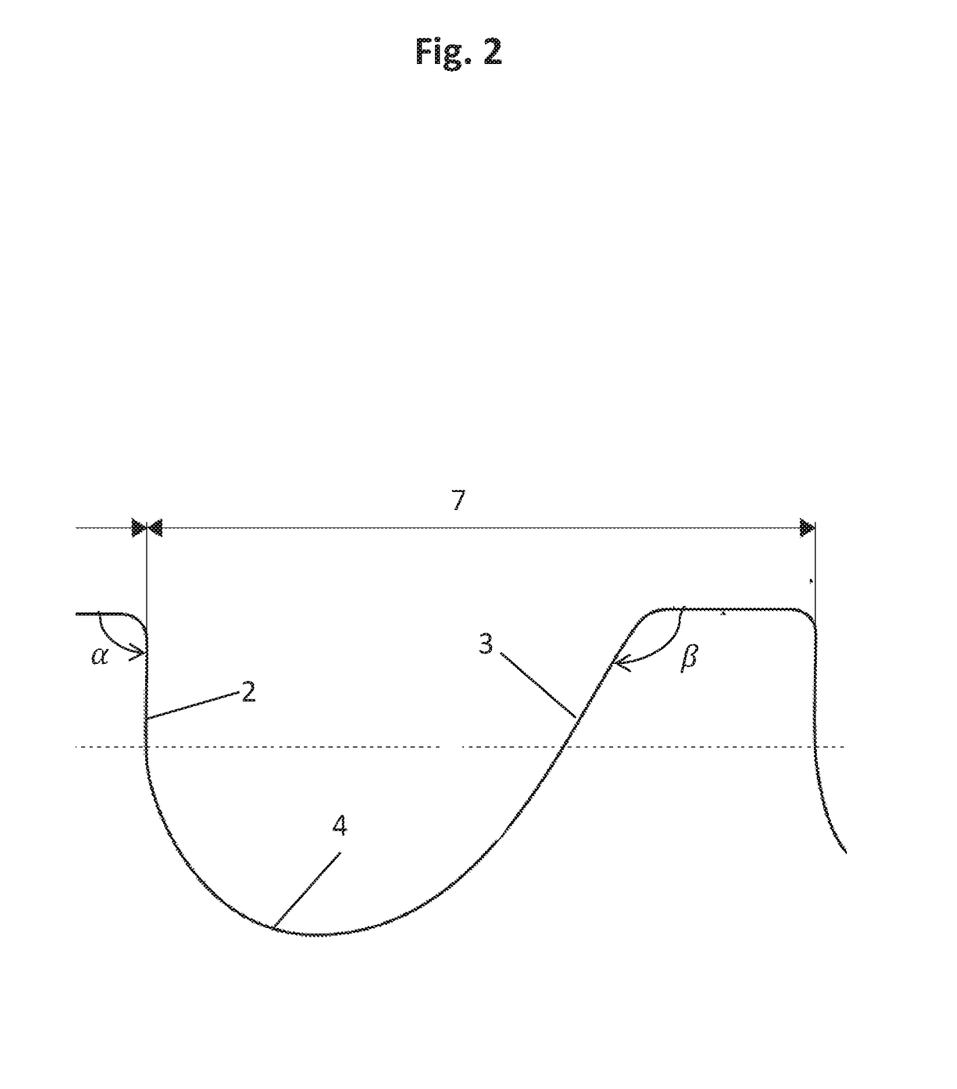
FIG. 2 shows another embodiment of a pull or push rod or locking nut according to the invention with a detailed view on its groove.

FIG. 2 shows a detailed view of a groove 1 of another embodiment of a pull or push rod or locking nut according to the invention. Compared to FIG. 1a or 1b, the groove side wall 3 is here inclined at an angle β to the surface of the pull or push rod or the surface of the imaginary core hole of the locking nut. With such an embodiment, as shown in FIG. 2, the incline of the groove side wall 3 can be used to achieve an optimal force transmission. Thus, this groove side wall 3, which is inclined by the angle β, can serve as the pull side when in use, and the groove side wall 2 as the compressive side. The groove 1, as shown in FIG. 2, has an incline of 7, so that the at least one groove wraps around a surface of the pull or push rod or a surface of the imaginary core hole of the locking nut in a thread-like manner. In addition, FIG. 1b shows the groove width 8 as well as the outer diameter 9 of the pull or push rod or the diameter 10 of the imaginary core hole of the locking nut.

Figure 3:
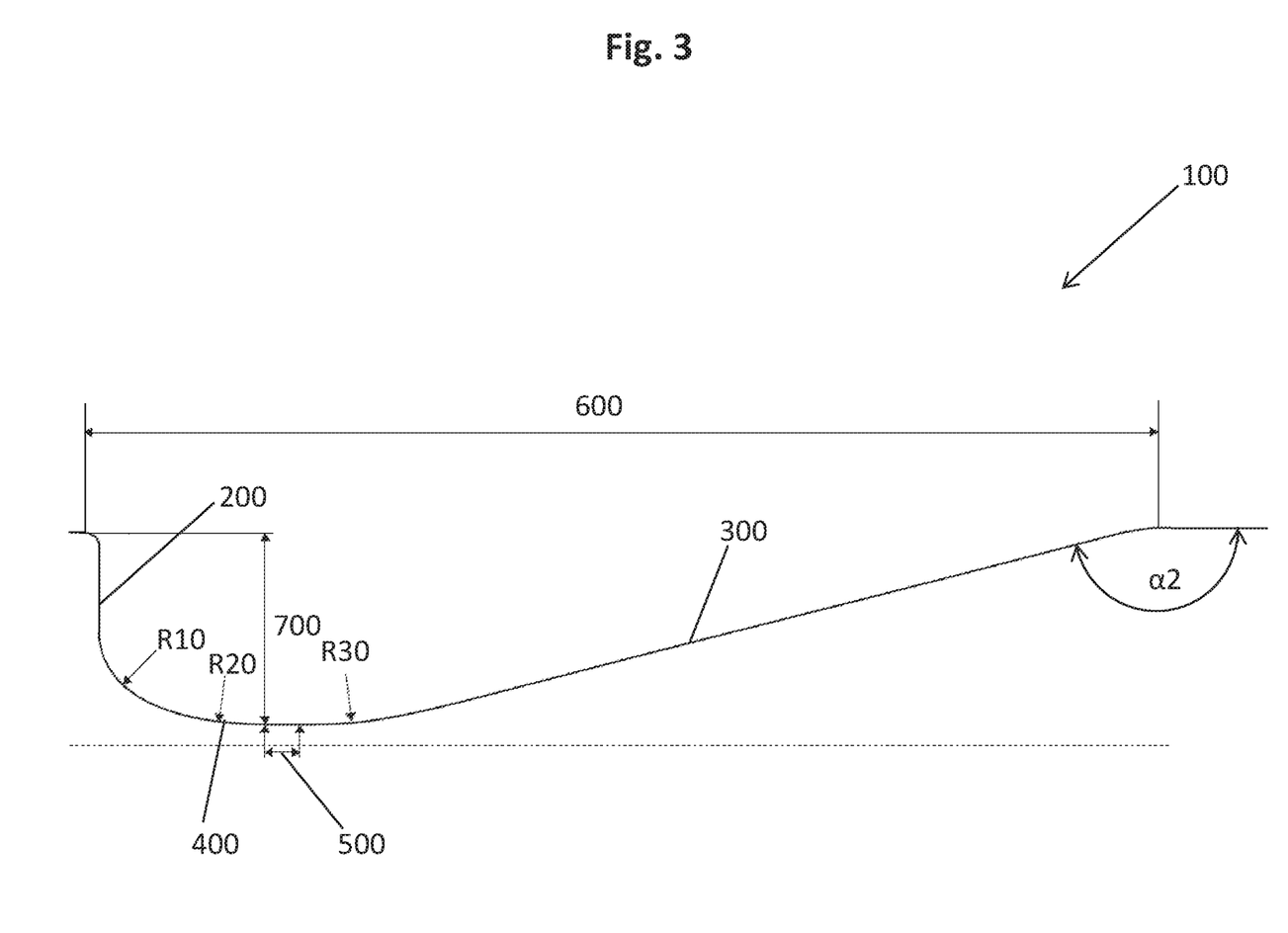
FIG. 3 shows a purely exemplary embodiment of a pull or push rod or locking nut according to the invention with an undercut.

FIG. 3 shows a partial view of a pull or push rod or locking nut according to the invention with an undercut 100 in cross-section (in the undercut cross section). Thereby only the undercut 100 is shown, and the at least one groove 1 is blanked out for reasons of clarity. The undercut 100 is designed with an undercut side wall 200, an undercut base 400, and an undercut ramp 300. Thereby the undercut side wall 200 transitions tangentially into a first undercut transition curvature (in this embodiment shown as undercut transition radius R10), which in turn transitions tangentially into the undercut curvature of the undercut base 400 (which in this embodiment is designed as undercut radius R20). The undercut base 400 or undercut radius R20 transitions tangentially into the second transition. This second transition is hereby designed as a two-part transition. First, by a straight-lined section 500, which enters directly into the undercut base 400, which in turn transitions tangentially into the undercut transition curvature (shown here as the undercut transition radius R30), which connects tangentially the straight-lined undercut ramp 300. The undercut ramp 300 is inclined at an angle of $\alpha 2$ to the surface of the pull or push rod or to the surface of an imaginary drilling of the locking nut. The entire undercut has an undercut length 600 and an undercut depth 700. This undercut depth 700 and undercut length 600 can be varied depending on the area of application and loads.

It can be clearly seen from FIG. 3 that the design of undercut base 400 as undercut radius R20 allows to reduce the notch effect by means of the undercut transition radii without this leading to a significant deepening of undercut 100.

LIST OF REFERENCE SIGNS

1 groove
2 groove side wall
3 groove side wall
4 groove base
5 side wall length
6 distance
7 incline
8 groove width
9 outer diameter of pull or push rod
10 diameter of the imaginary core hole of the locking nut
R1 transition radius
R2 radius
R3 transition radius
R4 radius
$\alpha$ angle
$\beta$ angle
100 undercut
200 undercut side wall
300 undercut ramp
400 undercut base
500 straight section
600 undercut length
700 undercut depth
R10 undercut transition radius
R20 undercut radius
R30 undercut transition radius
2 angles

The invention claimed is:

1. A pull or push rod for a molding machine having at least one groove, wherein the at least one groove is suitable for forming a positive-locking connection with a locking nut, by means of which positive-locking connection, forces are transmittable between the locking nut and the pull or push rod, wherein the at least one groove:
    has a groove cross-section,
    has at least two groove side walls, and
    has a groove base,
    wherein the at least two groove side walls, viewed in the groove cross-section, each transition with at least one transition curvature into the groove base, wherein the groove base in the groove cross-section is at least partially formed as a curvature, wherein the curvature of the groove base differs from the transition curvatures of the groove side walls.

2. The pull or push rod according to claim 1, wherein the pull or push rod has a rotationally symmetrical base body.

3. The pull or push rod or locking nut according to claim 1, wherein a radius of an imaginary curvature circle at at least one point of curvature of the groove base has a finite value larger than zero, which differs from a radius of an imaginary curvature circle at at least one point of at least one transition curvature of the transitions.

4. The pull or push rod or locking nut according to claim 1, wherein the at least one groove is formed completely or partially circumferentially on the pull or push rod or locking nut.

5. The pull or push rod or locking nut according to claim 1, wherein at least a first one of the at least two groove side walls has an angle of 70 to 110 degrees with respect to a surface of the pull or push rod or a surface of an imaginary core drilling of the locking nut.

6. The pull or push rod or locking nut according to claim 1, wherein a second of the at least two groove side walls has an angle of 70 to 150 degrees with respect to a surface of the pull or push rod or a surface of an imaginary core drilling of the locking nut.

7. The pull or push rod or locking nut according to claim 1, wherein the at least one groove in a thread-like manner wraps around a surface of the pull or push rod or a surface of an imaginary core drilling of the locking nut.

8. The pull or push rod or locking nut according to claim 1, wherein the groove has an incline which runs parallel to a central axis of the pull or push rod or the locking nut, and is at least greater than a groove width of the at least one groove per rotation.

9. The pull or push rod or locking nut according to claim 1, wherein at least one transition curvature of the at least two groove side walls transitions tangentially into the curvature of the groove base.

10. The pull or push rod or locking nut according to claim 1, wherein the transition curvatures are designed as transition radii.

11. The pull or push rod or locking nut according to claim 10, wherein
    the at least one transition radius of a first groove side wall to
    the at least one transition radius of a second groove side wall of the at least two groove side walls, is in a ratio of 1 to 2.

12. The pull or push rod or locking nut according to claim 10, wherein an outer diameter of the pull or push rod, or a diameter of an imaginary core hole of a locking nut to the at least one transition radius of a first groove side wall of the at least two groove side walls is in a ratio of 30 to 50.

13. The pull or push rod or locking nut according to claim 10, wherein an outer diameter of the pull or push rod, or a diameter of an imaginary core hole of a locking nut stands in a ratio of 40 to 60 to the at least one transition radius of a second groove side wall, of the at least two groove side walls.

14. The pull or push rod or locking nut according to claim 10, wherein a ratio between the greater of the amount of at least one transition radius of a first groove side wall, and at least one transition radius of a second groove side wall on the one hand, and a value of the radius of the groove base on the other hand, is 0.3 to 0.8.

15. The pull or push rod or locking nut according to claim 10, wherein the radius of the groove base has a finite value greater than zero, differing from the transition radii of the transitions.

16. The pull or push rod or locking nut according to claim 1, wherein the curvature of the groove base is designed as a radius.

17. The pull or push rod or locking nut according to claim 16, wherein an outer diameter of the pull or push rod, or a diameter of an imaginary core hole of a locking nut to the radius of the groove base is in a ratio of 10 to 30.

18. The pull or push rod or locking nut according to claim 1, wherein
a smallest diameter of the pull or push rod at the groove base to an outer diameter of the pull or push rod and/or
a diameter of an imaginary core hole of a locking nut to a maximum inner diameter at the groove base is in a ratio of 0.89 to 0.95.

19. The pull or push rod or locking nut according to claim 1, wherein at least two grooves are provided, wherein an outer diameter of the pull or push rod, or a diameter of an imaginary core hole of a locking nut, is in a ratio of 5 to 13 to a pitch of the at least two grooves.

20. The pull or push rod or locking nut according to claim 1, wherein an outer diameter of the pull or push rod, or a diameter of an imaginary core hole of a locking nut, is in a ratio of 15 to 27 to a groove width.

21. The pull or push rod or locking nut according to claim 1, wherein at least one undercut is provided, wherein the at least one undercut
has an undercut cross section,
an undercut side wall, and
an undercut ramp,
wherein the undercut side wall transitions via at least a first undercut transition curvature into an undercut base, and the undercut base transitions via at least a second undercut transition curvature into the undercut ramp, wherein the undercut base, viewed in the undercut cross-section, is formed at least partially as an undercut curvature, wherein the curvature of the undercut base differs from the at least one first, and/or the at least one second undercut transition curvature.

22. The pull or push rod or locking nut according to claim 21, wherein the at least one undercut is formed completely or partially circumferentially on the pull or push rod or locking nut.

23. The pull or push rod or locking nut according to claim 22, wherein the at least one first, or the at least one second undercut transition curvature transitions tangentially into the undercut curvature of the undercut base.

24. The pull or push rod or locking nut according to claim 22, wherein the undercut ramp, viewed in the undercut cross section, is designed straight-lined, and has an angle with respect to a surface of the pull or push rod, or a surface of an imaginary core hole of the locking nut, of 175 to 150 degrees.

25. The pull or push rod or locking nut according to claim 22, wherein a radius of an imaginary curvature circle at at least one point of the undercut curvature of the undercut base has a finite value greater than zero, which differs from a radius of an imaginary curvature circle at at least one point of the at least one first undercut transition curvature, and/or from an imaginary curvature circle at at least one point of the at least one second undercut transition curvature.

26. The pull or push rod or locking nut according to claim 22, wherein the at least one first undercut transition curvature is formed as a first undercut transition radius, and the at least one second undercut transition curvature is formed as a second undercut transition radius.

27. The pull or push rod or locking nut according to claim 26, wherein the value of the undercut radius of the undercut base is in a ratio to the at least one first undercut transition radius of 10 to 1.

28. The pull or push rod or locking nut according to claim 22, wherein the at least one second undercut transition radius is in a ratio of 20 to 2 to the at least one first undercut transition radius.

29. The pull or push rod or locking nut according to claim 22, wherein the undercut curvature of the undercut base is designed as an undercut radius.

30. The pull or push rod or locking nut according to claim 21, wherein the undercut side wall has an angle of 70 to 110 degrees with respect to a surface of the pull or push rod, or a surface of an imaginary core hole of the locking nut.

31. The pull or push rod or locking nut according to claim 21, wherein a straight section is provided between the at least one first, and/or the at least one second undercut transition curvature and the undercut base, viewed in the undercut cross-section.

32. A clamping unit of a molding machine or molding machine having a clamping unit with at least one pull or push rod, and/or at least one locking nut according to claim 1.

33. A clamping unit of a molding machine or molding machine with a clamping unit according to claim 32, wherein one of the at least two groove side walls represents a groove side wall of a pull side, and one of the at least two groove side walls represents a groove side wall of a compression side, wherein the at least one transition radius of the groove side wall of the compression side to the at least one transition radius of the groove side wall of the pull side, which connect the groove side walls to a groove base, are in a ratio of 1 to 2.

34. A method for producing a pull or push rod or a locking nut for a molding machine, comprising at least the following steps:
specifying a desired pulling or compressive force which is transmittable non-destructively with the pull or compression rod or locking nut;
selecting a suitable material for the pull or push rod or locking nut;
specifying a suitable groove geometry, wherein the at least one groove has a groove cross-section, at least two groove side walls and a groove base, wherein the at least two groove side walls, viewed in the groove cross-section, each transition into the groove base with at least one transition curvature, wherein the groove base in the groove cross-section is formed at least partially as a curvature, wherein the curvature of the groove base differs from the transition curvatures of the groove side walls, in particular according to claim 1;
specifying the minimum diameter of the pull or push rod or locking nut resulting from the desired pulling or compressive force, the material selected and the specified groove geometry; and
producing the pull or push rod or locking nut with the specified diameter and the specified groove geometry from a certain material.

35. The method for producing a pull or push rod or locking nut for a molding machine according to claim 34, wherein the pull or push rod or locking nut is subjected to a coating process.

36. The method for producing a pull or push rod or locking nut for a molding machine according to claim 34, wherein the pull or push rod or locking nut is subjected to a method for changing the material properties.

37. The method for producing a pull or push rod or locking nut for a molding machine according to claim 34, wherein the pull or push rod or locking nut is produced by means of a forming process.

38. The method for producing a pull or push rod or locking nut for a molding machine according to claim 34, wherein the pull or push rod or locking nut is produced by means of a machining process.

39. A locking nut for a molding machine with at least one groove, wherein the at least one groove is suitable for forming a positive-locking connection with a pull or push rod, by means of which positive-locking connection, forces are transmittable between the locking nut and the pull or push rod, wherein the at least one groove:
- has a groove cross-section,
- has at least two groove side walls, and
- has a groove base,
- wherein the at least two groove side walls, viewed in the groove cross-section, each transition with at least one transition curvature into the groove base, wherein the groove base in the groove cross-section is formed at least partially as a curvature, wherein the curvature of the groove base differs from the transition curvatures of the groove side walls.

* * * * *